United States Patent [19]

Hattori et al.

[11] Patent Number: 4,714,132

[45] Date of Patent: Dec. 22, 1987

[54] SUSPENSION OF VEHICLE

[75] Inventors: Tetsuo Hattori; Shoichi Seko, both of Toyota, Japan

[73] Assignee: Toyota Jidosha Kabushiki Kaisha, Toyota, Japan

[21] Appl. No.: 927,097

[22] Filed: Nov. 5, 1986

[30] Foreign Application Priority Data

Nov. 5, 1985 [JP] Japan .................. 60-246327

[51] Int. Cl.$^4$ ............................................ B60D 21/00
[52] U.S. Cl. .................................. 180/312; 280/690; 280/710; 280/716
[58] Field of Search ............... 280/688, 690, 710, 716; 180/312

[56] References Cited

U.S. PATENT DOCUMENTS 3,891,232  6/1975  Flemming ........................... 280/701
4,526,400  7/1985  Kijima et al. ....................... 280/690

Primary Examiner—John J. Love
Assistant Examiner—Kenneth R. Rice
Attorney, Agent, or Firm—Oblon, Fisher, Spivak, McClelland, & Maier

[57] ABSTRACT

A suspension of a vehicle includes a subframe coupled with a car body through four elastic insulators. Four insulators are disposed in the front leftward and rightward portion and the rear leftward and rightward portion of the subframe. A suspension arm is coupled vertically pivotably on an inner end thereof with the subframe. A wheel carrier is coupled vertically pivotably with an outer end of the suspension arm. A strut bar disposed longitudinally of the car body is coupled vertically pivotably with the wheel carrier on one end thereof and with the car body on the other end.

11 Claims, 3 Drawing Figures

SUSPENSION OF VEHICLE

BACKGROUND OF THE INVENTION

1. Field of the Invention

This invention relates to a suspension of a vehicle, and more particularly to an independent rear suspension of a vehicle having a rear wheel driven in which at least suspension arm for supporting the wheel through a wheel carrier and a differential gear are mounted on a subframe, said subframe being mounted on a car body through rubber insulators.

2. Description of the Prior Art

A suspension having a construction in which at least a suspension arm for supporting a wheel through a wheel carrier and a differential gear are mounted on a subframe which is coupled with a car body through a plurality of rubber insulators has such excellent features that load noises and vibrational noises of a drive line including the differential gear and a propeller shaft may be reduced, that assembling operation on a vehicle assembling line may be simplified and that the maintaining property of a vehicle may be improved.

When the suspension noted above is provided with a strut bar or a radius rod for restricting the forward and backward movement of the wheel carrier coupled with the suspension arm, the strut bar has been heretofore coupled with the subframe (for example, Japanese Utility Model Public Disclosure (KOKAI) No. 134309/82 and No. 192407/84) by reason that abnormal noises due to load noises or the like transmitted to the car body through the strut bar may be reduced and that operation of mounting the strut bar on the car body is somewhat facilitated.

SUMMARY OF THE INVENTION

When a strut bar of about 500 mm in length extends in the longitudinal direction of a car body to be coupled with a subframe, the length in the longitudinal direction of the subframe is elongated and the subframe itself is enlarged to cause the increase in weight.

Further, since a front insulator disposed in a connection between the car body and the subframe on each side thereof is located spaced a substantial distance in front of a wheel carrier, when any lateral force is applied to a wheel supported by the wheel carrier in turning or the like, the subframe is rotated in the direction of causing toe-out of the wheel by flection of the insulator so that the vehicle may have an over-steering property.

An object of the present invention is to provide a suspension of a vehicle in which a subframe is miniaturized to reduce weight.

Another object of the present invention is to provide a suspension of a vehicle in which rotation of a subframe is reduced as small as possible when a wheel receives any lateral force in order to restrict movement of the wheel in the toe-out direction, i.e., over-steering property.

A suspension according to the present invention comprises a subframe coupled with a car body through a plurality of elastic insulators, said insulators being disposed at the front leftward and rightward and the rear leftward and portion, or the front leftward and rightward and the rear central portion, at least a suspension arm disposed on each side of the subframe between the front and rear insulators and coupled on an inner end with the subframe pivotably in a vertical direction, a wheel carrier coupled with an outer end of the suspension arm pivotably in the vertical direction and a strut bar disposed in a longitudinal direction of the car body and coupled pivotably in the vertical direction on one end thereof with said wheel carrier or suspension arm and on the other end with the car body.

Since the strut bar is coupled with the car body, the length in the longitudinal direction of the subframe may be as short as possible and further a rotary axis of the wheel carrier may be easily designed to be disposed in the center of the distance between the insulators disposed in front and in the rear. Thus, the rotary axis of the wheel carrier is located in an approximately central portion of the distance between the insulators disposed in front and in the rear, thereby reducing the rotation of the subframe due to the lateral force acting on the wheel in travelling to be as small as possible in order to restrict the over-steering property so that controllability may be improved.

Since the strut bar is coupled with the car body, a longitudinal force transmitted from the wheel through the wheel carrier and strut bar is not transported to the subframe. Thus, the rigidity of the subframe may be reduced and the length in the longitudinal direction of the subframe itself may be shortened, thereby allowing for miniaturizing the subframe in order to reduce the weight.

BRIEF DESCRIPTION OF THE DRAWINGS

Other objects and features of the invention will become apparent from the following description of a preferred embodiment of the invention with reference to the accompanying drawings, in which.

PREFERRED DESCRIPTION OF THE EMBODIMENT

Figure 1:
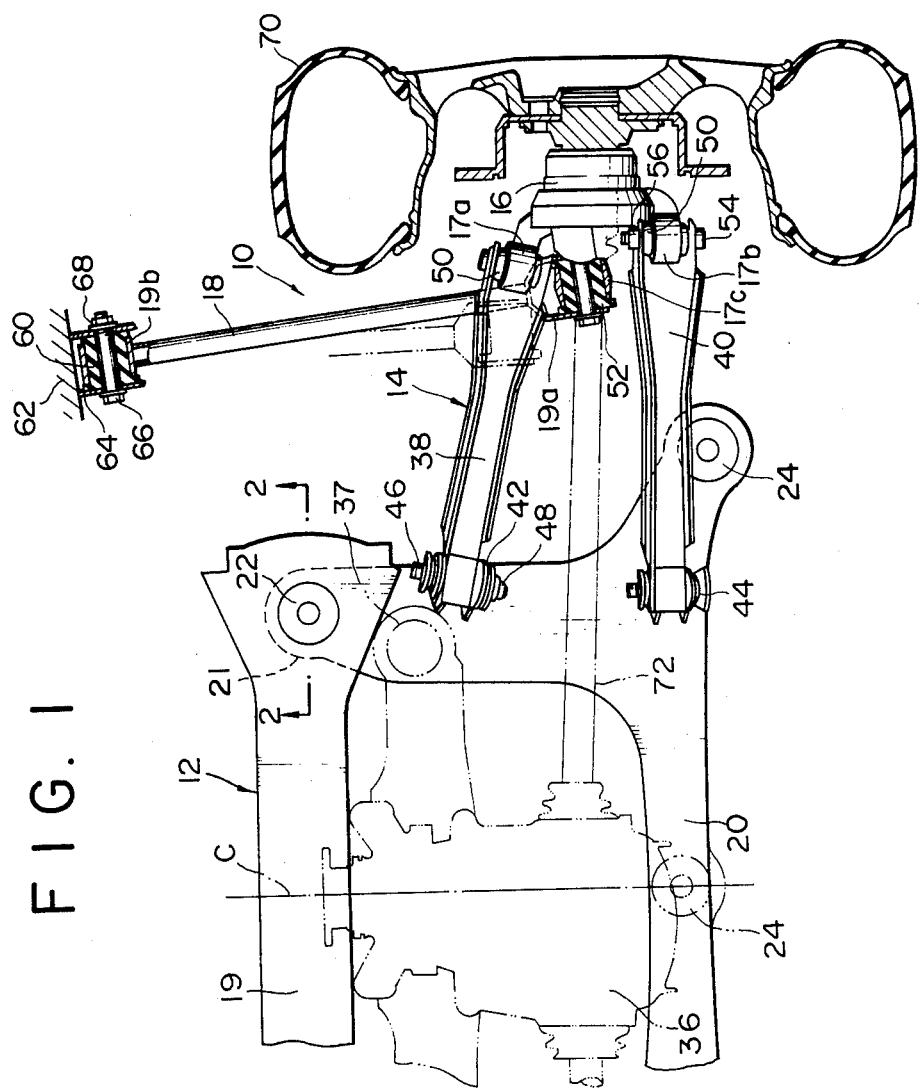
FIG. 1 is a plan view, partly in section, showing a suspension disposed in the right side of a car body.

Referring to FIG. 1, a suspension 10 comprises a subframe 12, a suspension arm 14, a wheel carrier 16 and a strut bar 18.

In the embodiment shown, the subframe 12 includes a first member 19 disposed laterally in a front portion of a car body and a second member 20 having a portion disposed laterally in a rear portion of the car body and a pair of portions disposed in a longitudinal direction of the car body, said second member 20 having a generally U-shaped outline as viewed in a plan. The first member 19 is integrally welded to the second member 20 at a connection 21. The first member 19 may be coupled with the second member 20 by bolts and nuts. The subframe 12 is coupled with the car body through a plurality of rubber or other elastic insulators.

A plurality of insulators are disposed symmetrically about the center line C extending in the longitudinal direction of the car body. In the embodiment shown, two insulators 22 are disposed respectively in a front leftward and rightward (only rightward is shown) portions and two insulators 24 are disposed respectively in rear leftward and rightward portions (only rightward is shown) so that the subframe 12 is coupled with the car body through total four insulators.

Figure 2:
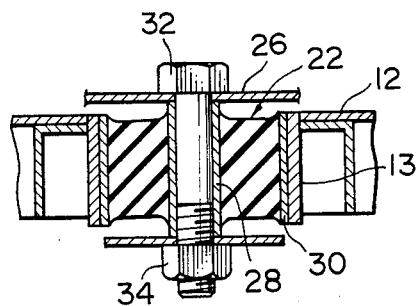
FIG. 2 is an enlarged sectional view taken along the line 2—2 in FIG. 1.

The constructions in which the respective insulators are coupled with the car body are same with one another. FIG. 2 shows the construction in which the insulator 22 in the front rightward is coupled with the car body 26. Inner and outer tubes 28,30 are respectively bonded to inner and outer peripheral surfaces of the insulator 22 and the outer tube 30 is press fitted into an eye 13 provided in the subframe 12. The inner tube 28 is disposed in spaced portions of the car body 26 and a bolt 32 is inserted into the car body 26 and inner tube 28. A nut 34 is screwed onto the bolt 32 to sandwich the inner tube 28 between the spaced portions of the car body 26.

A differential gear 36 is mounted on the subframe 12 through an insulator 37 by a coupling construction similar to that above mentioned and the subframe 12 is formed to support a rear drive wheel.

In the embodiment shown, the suspension arm 14 consists of a front link 38 and a rear link 40. An inner end of the front link 38 has a rubber bushing (not shown) and the front link 38 is coupled pivotably in a vertical direction through the bushing with a bracket 42 provided on a portion of each side of the subframe 12 in the rear of the insulator 22 by a bolt 46 and a nut 48. Also, an inner end of the rear link 40 has a rubber bushing (not shown) and the rear link 40 is coupled pivotably in the vertical direction through the bushing with a bracket 44 provided on a portion of each side of the subframe 12 in front of the insulator 24 by a bolt and a nut.

The wheel carrier 16 has eyes 17a, 17b spaced from each other in the longitudinal direction and an eye 17c provided on an intermediate portion between both eyes and below them. A rubber bushing 50 is press fitted into the respective eyes 17a, 17b and a rubber bushing 52 into the eye 17c. A yoke provided on an outer end of the front link 38 is disposed so as to sandwich the eye 17a and a yoke provided on an outer end of the rear link 40 is disposed so as to sandwich the eye 17b. The wheel carrier 16 is coupled pivotably in the vertical direction with the front and rear links 38,40 by bolts 54 and nuts 56 respectively.

The strut bar 18 is disposed in the longitudinal direction (including oblique direction as shown in the drawings) of the car body to restrain the forward and backward movement of the wheel carrier 16. The strut bar 18 has a yoke 19a on the rear end and an eye 19b on the front end, a rubber bushing 60 being press fitted into the eye 19b. The yoke 19a is disposed so as to sandwich the eye 17c of the wheel carrier 16. On the other hand the eye 19b is inserted into a bracket 64 projecting from the car body 62, both yoke and eye being coupled with the bracket by a bolt 66 and a nut 68 respectively. Thus, the wheel carrier 16 and strut bar 18 are vertically pivotable.

The wheel carrier 16 is coupled with the subframe 12 through the front and rear links 38,40 such that the rotary axis, i.e., the rotary center L (FIG. 3) of a wheel 70 is approximately located in the center of distance between the front and rear insulators 22,24. This construction is possible since the strut bar 18 is not coupled with the subframe 12, i.e., since the subframe 12 needs to be so as to be longer in the longitudinal direction and the front insulator 22a is located necessarily in front of the insulator 22 while the length of the strut bar 18 is constant as shown by the phantom line in FIG. 3 when the strut bar 18 is coupled with the subframe 12, the axis L of the wheel carrier 16 cannot be located in the central portion between the front insulator 22a and the rear insulator 24, whereas the selection of positions where the front and rear links 38,40 are mounted on the subframe 12 is not substantially restrained when the subframe 12 is free from the strut bar 18.

A shock absorber (not shown) is disposed between an upper portion of the wheel carrier 16 and the car body to constitute a Mcpherson strut type suspension 10 known per se. To the wheel 70 is connected a drive shaft 72 extended from the differential gear 36 to drive the wheel 70.

Figure 3:
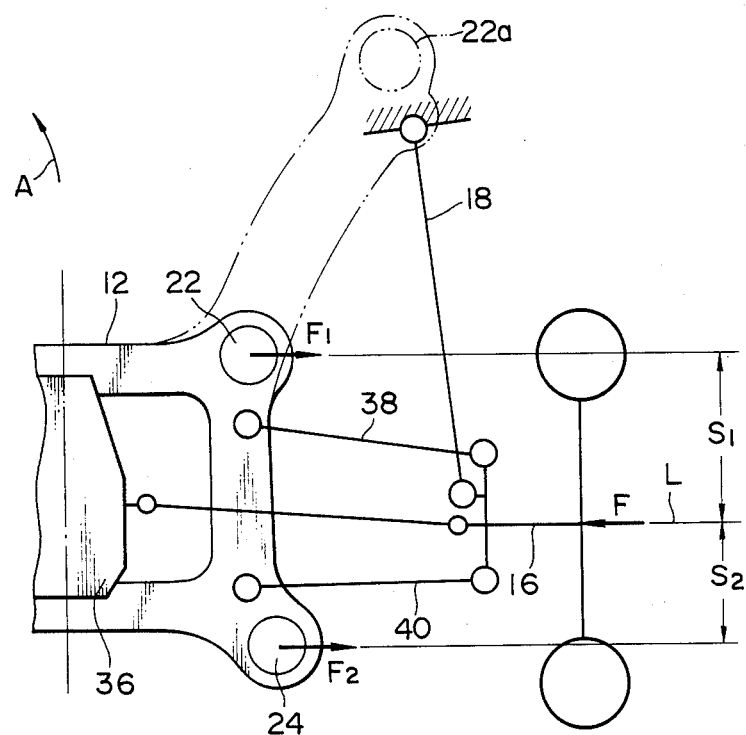
FIG. 3 is a plan view showing operation of the suspension.

When a travelling vehicle turns left as shown by the arrow A in FIG. 3, a lateral force F acts on the wheel 70 and is transmitted to the car body through the front and rear insulators 22,24 of the subframe 12 to generate reactions $F_1, F_2$ on the insulators 22,24 respectively, where, $$F_1 = F \times S_2/(S_1+S_2) \text{ and}$$

$$F_2 = F \times S_1/(S_1 S_2)$$

Now, since $S_1 \approx S_2$, $F_1 \approx F_2$ and the subframe 12 is moved laterally by flection of the insulators 22,24 while hardly generating rotational motion so that the wheel 70 is not moved in the toe-out direction.

Instead of the aforementioned embodiment, three insulators may be used for the subframe 12. In this case, two insulators are disposed in the front leftward portion and rightward and one insulator 24 is disposed in the rear. The one rear portion insulator 24 is disposed on the center line C of the second member 20 as shown by the phantom line in FIG. 1.

The suspension arm 14 may be constituted from a single link, i.e., so-called I arm. The upper portion of the wheel carrier 16 may be coupled with an upper arm an inner end of which is coupled with the subframe instead of the shock absorber to constitute a double wishbone type suspension known per se.

The strut bar 18 may be coupled with the suspension arm 14 as shown by the phantom line in FIG. 1. When the suspension arm 14 consists of the front and rear links 38,40, the strut bar 18 may be coupled with either of the front and rear links.

Obviously, numerous modifications and variations of the present invention are possible in light of the above teachings. It is therefore to be understood that within the scope of the appended claims, the invention may be practiced otherwise than as specifically described herein.

What is claimed is:

1. A suspension of a vehicle having a differential, said suspension comprising:
   a subframe formed as a unit having a plurality of elastic insulators, four of said insulators being disposed at the front leftward and rightward portion and a rear leftward and rightward portion, said subframe being coupled to a car body through said plurality of insulators, said differential being mounted on said subframe;
   at least one suspension arm disposed on each side of the subframe between the front and rear insulators and coupled at an inner end thereof with the subframe so as to be pivotable in a vertical direction;
   a wheel carrier pivotably coupled with an outer end of the suspension arm in the vertical direction; and
   a strut bar disposed longitudinally of the car body and coupled at one end thereof with either said wheel carrier and suspension arm and at the other end with the car body respectively pivotably in the vertical direction.

2. A suspension of a vehicle as claimed in claim 1, wherein the number of said insulators is four.

3. A suspension of a vehicle as claimed in claim 1, further comprising an insulator for coupling said differential to said subframe.

4. A suspension of a vehicle having a differential, said suspension comprising:
- a subframe formed as a unit having a plurality of insulators, three of said insulators being disposed at the front leftward and rightward portion and a rear central portion, said subframe being coupled with a car body through said plurality of insulators, said differential being mounted on said subframe;
- at least one suspension arm disposed on each side of the subframe between the front and rear insulators and coupled at an inner end thereof with the subframe so as to be pivotable in a vertical direction;
- a wheel carrier pivotably coupled with an outer end of the suspension arm in the vertical direction; and
- a strut bar disposed longitudinally of the car body and coupled at one end thereof with either said wheel carrier and suspension arm and at the other end with the car body respectively pivotably in the vertical direction.

5. A suspension of a vehicle as claimed in claim 1 or 4, wherein a rotary axis of said wheel carrier is located approximately in the center of distance between said front and rear insulators.

6. A suspension of a vehicle as claimed in claim 1 or 4, wherein said subframe is used for a rear wheel and a differential gear is mounted on the subframe.

7. A suspension of a vehicle as claimed in claim 4, wherein the number of said insulators is three.

8. A suspension of a vehicle having a differential, said suspension comprising:
- a subframe including a first member disposed laterally and a second member fixed securely to the first member which has a generally U-shaped outline as viewed in plan, the subframe being coupled with a car body through a plurality of elastic insulators, three of said insulators being disposed at a front leftward and rightward portion and a rear central portion, said differential being mounted on said subframe;
- at least one suspension arm disposed on each side of the second member of the subframe between the front and rear insulators and coupled at an inner end thereof with the second member of the subframe pivotably in a vertical direction, said differential being mounted on said subframe;
- a wheel carrier pivotably coupled with an outer end of the suspension arm in the vertical direction; and
- a strut bar disposed longitudinally of the car body and coupled at one end thereof with either said wheel carrier and suspension arm and at the other end with the car body respectively pivotably in the vertical direction.

9. A suspension of a vehicle having a differential, said suspension comprising:
- a subframe coupled with a car body through a plurality of elastic insulators, four of said insulators being disposed at a front leftward and rightward portions and a rear leftward and rightward portion, said differential being mounted on said subframe;
- means for coupling respective insulators, each of which includes inner and outer tubes respectively bonded to inner and outer peripheral surfaces of the insulator, a bolt extended through the car body and inserted into the inner tube, and the outer tube being fitted into an eye provided in the subframe;
- at least one suspension arm disposed on each side of the subframe between the front and rear insulators and pivotably coupled at an inner end thereof with the the subframe in a vertical direction;
- a wheel carrier pivotably coupled with an outer end of the suspension arm in the vertical direction; and
- a strut bar disposed longitudinally of the car body and coupled at one end thereof with either said wheel carrier and suspension arm and at the other end with the car body respectively pivotably in the vertical direction.

10. A suspension of a vehicle having a differential, said suspension comprising:
- a subframe coupled with a car body through a plurality of elastic insulators, three of said insulators being disposed at a front leftward and rightward portions and a rear central portion, said differential being mounted on said subframe;
- means for coupling respective insulators each of which includes inner and outer tubes respectively bonded to inner and outer peripheral surfaces of the insulator, a bolt extended through the car body and inserted into the inner tube, and the outer tube being fitted into an eye provided in the subframe;
- at least one suspension arm disposed on each side of the subframe between the front and rear insulators and pivotably coupled at an inner end thereof with the the subframe in a vertical direction;
- a wheel carrier pivotably coupled with an outer end of the suspension arm in the vertical direction; and
- a strut bar disposed longitudinally of the car body and coupled at one end thereof with either said wheel carrier and suspension arm and at the other end with the car body respectively pivotably in the vertical direction.

11. A suspension of a vehicle having a differential, said suspension comprising:
- a subframe including a first member disposed laterally and a second member fixed securely to the first member which has a generally U-shaped outline as viewed in plan, the subframe being coupled with a car body through a plurality of elastic insulators, four of said insulators being disposed at a front leftward and rightward portion and a rear leftward and rightward portion, said differential being mounted on said subframe;
- at least one suspension arm disposed on each side of the second member of the subframe between the front and rear insulators and pivotably coupled at an inner end thereof with the second member of the subframe in a vertical direction;
- a wheel carrier pivotably coupled with an outer end of the suspension arm in the vertical direction; and
- a strut bar disposed longitudinally of the car body and coupled at one end thereof with either said wheel carrier and suspension arm and at the other end with the car body respectively pivotably in the vertical direction.

* * * * *